US009008710B2

(12) United States Patent
Chetlur et al.

(10) Patent No.: US 9,008,710 B2
(45) Date of Patent: Apr. 14, 2015

(54) CONTROLLING COMMUNICATION BETWEEN WHITESPACE DEVICES

(75) Inventors: Malolan Chetlur, Bangalore (IN); Harish Ganapathy, Sunnyvale, CA (US); Shivkumar Kalyanaraman, Bangalore (IN); Mukundan Madhavan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 360 days.

(21) Appl. No.: 13/523,528

(22) Filed: Jun. 14, 2012

(65) Prior Publication Data
US 2013/0172033 A1 Jul. 4, 2013

Related U.S. Application Data

(63) Continuation of application No. 13/339,573, filed on Dec. 29, 2011.

(51) Int. Cl.
*H04B 7/00* (2006.01)
*H04W 16/14* (2009.01)

(52) U.S. Cl.
CPC ..................... *H04W 16/14* (2013.01)

(58) Field of Classification Search
CPC . H04W 36/0083; H04W 16/14; H04W 88/08; H04W 72/0453; H04W 84/045
USPC ........... 455/456.1, 435.2, 440, 444, 449, 524, 455/525, 422.1, 404.2, 450, 509; 370/328, 370/329, 338
See application file for complete search history.

(56) References Cited

U.S. PATENT DOCUMENTS 8,787,907 B2 * 7/2014 Jain et al. ...................... 455/434
2009/0135798 A1 * 5/2009 Pecen .......................... 370/338
(Continued)

FOREIGN PATENT DOCUMENTS

WO WO 2010/139057 A1 12/2010
WO WO 2010/142021 A1 12/2010
(Continued)

OTHER PUBLICATIONS

Swami, A., et al., "Decentralized Cognitive Mac for Dynamic Spectrum Access," in First IEEE Intern. Symp. on Dynamic Spectrum Access Networks (IEEE DySPAN 2005), pp. 224-232, Nov. 2005, Baltimore, MD.
(Continued)

*Primary Examiner* — Dominic E Rego
(74) *Attorney, Agent, or Firm* — Edward J. Lenart; Mark McBurney; Biggers Kennedy Lenart Spraggins LLP (57) ABSTRACT

Methods, apparatuses, and computer program products for controlling communication between whitespace devices are provided. Embodiments include identifying, by a base-station array controller, a user whitespace device within a coverage area of a base-station array, wherein the base-station array includes a plurality of base-station whitespace devices of varying power consumption profiles; identifying for each base-station whitespace device, by the base-station array controller, transmission channels available to the base-station whitespace device; selecting from the plurality of base-station whitespace devices, by the base-station array controller, a base-station whitespace device based on the power consumption profiles and the identified available transmission channels corresponding to the plurality of base-station whitespace devices; and instructing, by the base-station array controller, the selected base-station whitespace device to communicate with the identified user whitespace device on one of the identified available transmission channels.

5 Claims, 5 Drawing Sheets

(56) References Cited

U.S. PATENT DOCUMENTS

| | | | |
|---|---|---|---|
| 2009/0197603 A1* | 8/2009 | Ji et al. | 455/436 |
| 2009/0247157 A1* | 10/2009 | Yoon et al. | 455/434 |
| 2009/0316649 A1* | 12/2009 | Chen | 370/331 |
| 2010/0107210 A1 | 4/2010 | Rouhana, Jr. | |
| 2010/0137014 A1 | 6/2010 | Rao et al. | |
| 2010/0311435 A1 | 12/2010 | Mueck et al. | |
| 2011/0019104 A1 | 1/2011 | Kwak et al. | |
| 2011/0080882 A1* | 4/2011 | Shu et al. | 370/329 |
| 2011/0143761 A1* | 6/2011 | Uusitalo et al. | 455/450 |
| 2011/0306375 A1* | 12/2011 | Chandra et al. | 455/509 |
| 2012/0093092 A1* | 4/2012 | Kasslin et al. | 370/329 |
| 2012/0115540 A1* | 5/2012 | Kurose et al. | 455/525 |
| 2013/0016221 A1* | 1/2013 | Charbit et al. | 348/180 |
| 2013/0079048 A1 | 3/2013 | Cai et al. | |
| 2013/0172032 A1 | 7/2013 | Chetlur et al. | |
| 2014/0051467 A1* | 2/2014 | Tan et al. | 455/501 |
| 2014/0113647 A1* | 4/2014 | Shen et al. | 455/452.1 |

FOREIGN PATENT DOCUMENTS

| | | |
|---|---|---|
| WO | WO 2011/041052 A1 | 4/2011 |
| WO | WO 2011/062395 A2 | 5/2011 |

OTHER PUBLICATIONS

Bahl, P., et al., "KNOWS: Cognitive Radio Networks Over White Spaces", in IEEE Intern. Symp. on Dynamic Spectrum Access Networks (IEEE DySPAN 2007), Apr. 2007, pp. 416-424, Dublin, Ireland.

Hsu, A., et al., "A Cognitive Mac Protocol Using Statistical Channel Allocation for Wireless Ad-Hoc Networks," in Proc. Wireless Commun. and Networking Conf. (IEEE WCNC 2007), Mar. 2007, pp. 105-110, Hong Kong, China.

Bahl, P., et al., "A Hardware Platform for Utilizing TV Bands With a Wi-Fi Radio", In IEEE LANMAN, Jun. 2007, pp. 49-53, Redmond, USA.

Challapali, K., et al., "C-MAC: A Cognitive MAC Protocol for Multi-channel Wireless Networks", in IEEE Intern. Symp. on Dynamic Spectrum Access Networks (IEEE DySPAN), Apr. 2007, pp. 147-157, Dublin, Ireland.

Su, H., et al., "Cognitive Radio Based Multi-channel MAC Protocols for Wireless Ad Hoc Networks", in Proc. Global Telecommunications Conf. (IEEE GLOBECOM 2007), Nov. 2007, pp. 4857-4861, New Orleans, LA.

Su, H., et al, "CREAM-MAC: An Efficient Cognitive Radio-Enabled Multi-Channel MAC Protocol for Wireless Networks", In IEEE International Symp. on World of Wireless Mobile and Multimedia Networks (IEEE WOWMOM 2008), Jun. 2008, pp. 1-8, Newport Beach, CA.

Bahl, P., et al., "White Space Networking With Wi-Fi Like Connectivity," in ACM SIGCOMM 2009, Aug. 2009, pp. 1-12, Barcelona, Spain.

Deb, S., et al., "Dynamic Spectrum Access in DTV Whitespaces: Design Rules, Architecture, and Algorithms," ACM MOBICOM 2009, Sep. 2009, pp. 1-16, Beijing, China.

Gaddam, V., et al., "Feasibility Study of Sensing TV Whitespace With Local Quiet Zone", International Conference on Systems, Man and Cybernetics, 2009. SMC 2009. IEEE International Conference on Digital Object Identifier: 10.1109/ICSMC.2009.5345967, Publication Year: 2009 , pp. 2287-2292, San Antonio, TX, USA.

Calabrese, M.; "Broadcast to Broadband: Unlicensed Access to Unused TV Channels?", Internet Computing, IEEE vol. 12, Issue: 2 Digital Object Identifier: 10.1109/MIC.2008.29, Publication Year: 2008, pp. 71-75.

"White Spaces and Mobile Communications", Alcatel—Lucent Strategic White Paper, accessed Sep. 28, 2011, 11 pages , URL: http://www.google.co.in/url?sa=t&source=web&cd=8&ved=0CEUQFjAH&url=http%3A%2F%2Fwww.alcatel-lucent.com%2Fwps%2FDocumentStreamerServlet%3FLMSG_CABINET%3DDocs_and_Resource_Ctr%26LMSG_CONTENT_FILE%3DWhite_Papers%2FWhite_Spaces_EN_StraWhitePaper.pdf&rct=j&q=(white%20space%20OR%20(vacant%20OR%20unoccupaid%20OR%20unused)%20channel)%20%20fixed%20potable%20devices%20base%20station&ei=jVMJTs2tO5HyrQfs8MyiDw&usg=AFQjCNHnK8iZDH0slWwEGcgt5-WdobmdJQ&cad=rja.

"Analyzing the New TV White Space Rules", accessed Sep. 28, 2011, 35 pages, URL: http://www.rinicoran.com/assets/Analyzing%20the%20New%20TV%20White%20Space%20Rules.pdf.

Brian Webster Consulting, "TV White Spaces can be used for fixed wireless in large metro markets . . . but only if themanufacturers change equipment design convention", Dec. 27, 2010 [accessed Jun. 23, 2011], 3 pages, URL: http://brianwebsterconsulting.wordpress.com/2010/12/27/tv-whitepsaces-can-be-used-for-fixed-wireless-in-large-metro-markets-but-only-if-the-manufacturers-change-equipment-design-convention/.

* cited by examiner

CONTROLLING COMMUNICATION BETWEEN WHITESPACE DEVICES

CROSS-REFERENCE TO RELATED APPLICATION

This application is a continuation application of and claims priority from U.S. patent application Ser. No. 13/339,573, filed on Dec. 29, 2011.

BACKGROUND OF THE INVENTION

1. Field of the Invention

The field of the invention is data processing, or, more specifically, methods, apparatuses, and computer program products for controlling communication between whitespace devices.

2. Description of Related Art

In telecommunications, whitespaces refer to frequencies allocated to broadcasting services but not used locally. National and international bodies assign bands for specific uses, and in most cases, license the rights to the spectrum. This frequency allocation process creates a band plan, in which guard bands may be assigned between used radio bands or channels to avoid interference. In addition, there may be unused portions of radio spectrum that have either never been used or are becoming available as a result of technical changes.

In the United States, the Federal Communications Commission (FCC) ruled that unlicensed devices guaranteeing that they will not interfere with assigned broadcasts can use the empty whitespaces in the frequency spectrum. A device intended to use these available channels is often referred as a whitespace device (WSD). A whitespace device may be used to transmit data to another whitespace device over available transmission channels. For example, various proposals, including IEEE 802.22 have advocated using whitespaces left by the termination of analog TV to provide wireless broadband Internet access. The number of transmission channels available to a whitespace device may be dependent upon the coverage area of the whitespace device which is a function of the transmitting power of the whitespace device.

In general, the higher the transmission power of a whitespace device, the greater the coverage area and the higher the throughput the whitespace device can provide. However, in densely populated urban areas, user-base of bandwidth is high and thus the whitespace spectrum available to high transmission power whitespace devices is limited. In this situation, some low transmission power whitespace devices may have more available transmission channels than a high transmission power whitespace device. While the low transmission power whitespace device may have the available transmission channels, the low transmission power whitespace device may not provide enough throughput to meet a user whitespace device's needs. Consequently, selecting a transmitting whitespace device with a high transmission power or a low transmission power may result in one or more performance tradeoffs including insufficient throughput capabilities or an insufficient coverage area.

SUMMARY OF THE INVENTION

Methods, apparatuses, and computer program products for controlling communication between whitespace devices are provided. Embodiments include identifying, by a base-station array controller, a user whitespace device within a coverage area of a base-station array, wherein the base-station array includes a plurality of base-station whitespace devices of varying power consumption profiles; identifying for each base-station whitespace device, by the base-station array controller, transmission channels available to the base-station whitespace device; selecting from the plurality of base-station whitespace devices, by the base-station array controller, a base-station whitespace device based on the power consumption profiles and the identified available transmission channels corresponding to the plurality of base-station whitespace devices; and instructing, by the base-station array controller, the selected base-station whitespace device to communicate with the identified user whitespace device on one of the identified available transmission channels.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
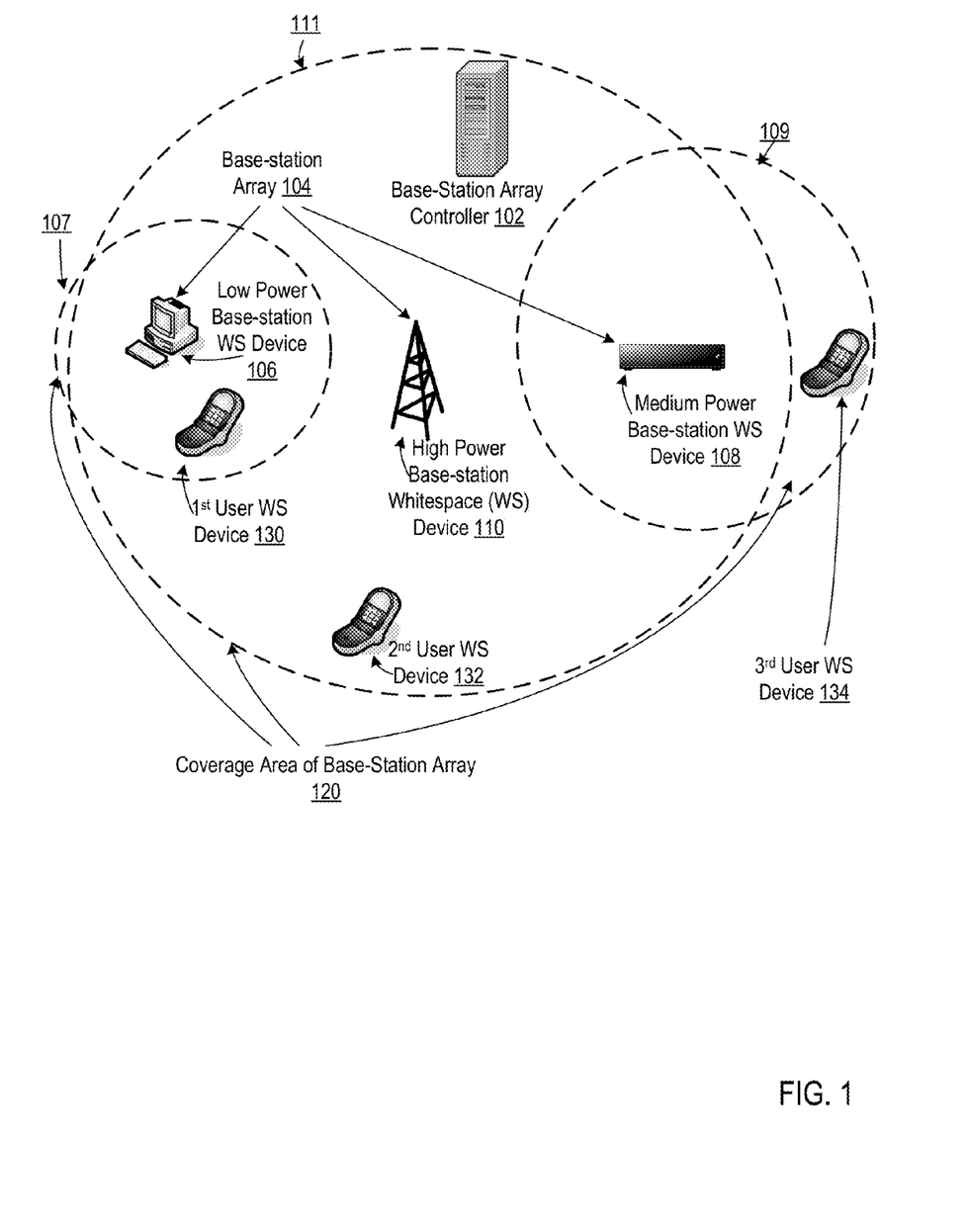
FIG. 1 sets forth a block diagram of a base-station array comprising a plurality of base-station whitespace devices in accordance with embodiments of the present invention.

Exemplary methods, apparatuses, and computer program products for controlling communication between whitespace devices in accordance with the present invention are described with reference to the accompanying drawings, beginning with FIG. 1. FIG. 1 sets forth a block diagram of a base-station array (102) comprising a plurality of base-station whitespace devices in accordance with embodiments of the present invention. The base-station array (102) of FIG. 1 includes a high transmission power base-station whitespace device (110), a medium transmission power base-station whitespace device (108), and a low transmission power base-station whitespace device (106).

A whitespace device is any device with a wireless transmitter that communicates over whitespace frequencies. In this disclosure, the phrase "whitespace frequency" generally refers to one or more frequency bands of electromagnetic radiation allocated by a government for unlicensed use by the public. In some examples, the whitespace frequency may include one or more unused channels of a television broadcast spectrum. These whitespace devices may operate in a cognitive manner in which the devices first scan a prescribed spectrum to detect TV band signals from licensed primary users (or any users) and then select unused channels in order to avoid interference with the licensed signals.

In some examples, sensing whether a whitespace frequency is available for use may include scanning of one or more frequencies to determine whether other uses (e.g., licensed users) are already using the whitespace frequency. However, other techniques for sensing whether a whitespace frequency is available may also be used. For example, geo-location sensing could be used to determine the geo-location of the whitespace device, and based on the geo-location of the whitespace device, available whitespace frequencies or channels may be determined. For example, a whitespace spectrum map indicating available channels may be retrieved from a spectrum-map database. The whitespace device may limit transmission to available whitespace channels so as to protect primary licensed users from interference from the whitespace device.

A whitespace device may operate using an antenna to broadcast a whitespace broadcast signal to a corresponding antenna of a whitespace receiver. As non-limiting examples, a whitespace broadcast signal may be generated by a whitespace transmitter to conform to a digital broadcast format, such as an Advanced Television Systems Committee (ATSC) format, a Digital Video Broadcasting (DVB) format, a Terrestrial Digital Multimedia Broadcasting (T-DMB) format, an Integrated Services Digital Broadcasting Terrestrial (ISDB-T) format, or a Moving Picture Experts Group Transport Stream (MPEG-TS) format, provided by International Standard ISO/IEC 13818-1, to name only a few. ATSC standards are a set of standards developed by the Advanced Television Systems Committee for digital television transmission. DVB standards are a suite of internationally accepted, open standards for digital television, and are published by a Joint Technical Committee (JTC) of European Telecommunications Standards Institute (ETSI), European Committee for Electrotechnical Standardization (CENELEC), and European Broadcasting Union (EBU). DMB is a digital radio transmission technology for sending multimedia data to mobile devices. ISDB is a Japanese standard for digital television and digital radio. Other wireless standards might also be used for a broadcast signal, including mobile broadcast standards such as Advanced Television Systems Committee—Mobile/Handheld (ATSC M/H), FO EV, Digital Multimedia Broadcast-handheld (DVB-H), Digital Multimedia Broadcast-satellite services to handheld DVB-SH, and next generation mobile broadcast standards. In addition, NTSC standards and next generation National Television System Committee NTSC standards might also be used in some examples. Also, standards such as third generation (3G) standards, third-generation multimedia broadcast multicast service (3G MBMS), Broadcast and Multicast Services (BC-MCS), long term evolution broadcast (LTE(broadcast)), or numerous other standards may be used as well.

A base-station whitespace device is a device that is used for transmitting data via a whitespace frequency to a user whitespace device. A user whitespace device is any device that is capable of receiving whitespace broadcast signals. Examples of user whitespace devices may include a mobile phone that includes a whitespace transmitter or receiver. For example, a base-station whitespace device may be used to transmit broadband Internet data to a user whitespace device. Base-station whitespace devices may be classified according to transmission power consumption. For example, the high transmission power base-station whitespace device (110) may be a fixed device that transmits at a maximum of four watts (W), the medium transmission power base-station whitespace device (108) may be a mobile device that transmits at a maximum of one hundred milli-watts (also referred to as a 'Mode II' device), and the low transmission power base-station whitespace device (106) may be a mobile device that transmits at a maximum strength of forty milli-watts (also referred to as a 'Mode I' device).

As explained above, the coverage area of a base-station whitespace device (i.e., the area that the base-station's broadcast whitespace signal is capable of reaching), directly corresponds to the transmission power of the base-station whitespace device. In the example of FIG. 1, a coverage area (107) of the low transmission power base-station whitespace device (106) is smaller than a coverage area (109) of the medium transmission power base-station whitespace device (108), which is still smaller than a coverage area (111) of the high power base-station whitespace device (110). In many areas, the coverage areas (107, 109, 111) overlap and a user whitespace device may be in more than one coverage area. For example, in FIG. 1 a first user whitespace device (130) is within the coverage area (107) of the low transmission power base-station whitespace device (106) and the coverage area (111) of the high transmission power base-station whitespace device (110), while a second user whitespace device (132) is only within the coverage area (111) of the high transmission power base-station whitespace device (110). A third user whitespace device (134) is outside both the coverage area (107) of the low transmission power base-station whitespace device (106) and the coverage area (111) of the high transmission power base-station whitespace device (110) but is within the coverage area (109) of the medium power base-station whitespace device (108).

In a particular embodiment, the base-station whitespace devices (106, 110, 108) may each be configured to transmit data to one or more user whitespace devices (130, 132, 134). However, selecting a base-station whitespace devices as the sole device to transmit data to a particular user whitespace device may represent one or more performance tradeoffs including insufficient throughput capabilities or an insufficient coverage area. To overcome this problem, the base-station whitespace devices (106, 110, 108) are combined into a base-station array (104). Combining the base-station whitespace devices into a base-station array enables the available channels, coverage areas, and throughput capabilities of all the base-station whitespace devices to be pulled together so that data can be delivered to a user whitespace device by the optimal base-station whitespace device.

A base-station array controller (102) is configured to determine which base-station whitespace device should be instructed to communicate with which user whitespace device and in general is configured to control communication between the whitespace devices (106, 110, 108, 130, 132, 134). Specifically, the base-station array controller (102) is configured to identify a user whitespace device within a coverage area of the base-station array (102); identify for each base-station whitespace device, transmission channels available to the base-station whitespace device; select from the plurality of base-station whitespace devices a base-station whitespace device based on the power consumption profiles and the identified available transmission channels corresponding to the plurality of base-station whitespace devices; and instruct the selected base-station whitespace device to communicate with the identified user whitespace device on one of the identified available transmission channels.

By utilizing a base-station array, each base-station whitespace device may be paired with a user whitespace device to optimize the benefits of the base-station whitespace devices and the requirements of the user whitespace device. For example, user whitespace devices that are within close proximity to a low transmission power base-station whitespace device may be assigned to that base-station, while the transmission channels available to a high transmission power base-station whitespace device may be reserved for a user whitespace device that is further away from a base-station array.

Controlling communication between whitespace devices in accordance with the present invention is generally implemented with computers, that is, with automated computing machinery. In the example of FIG. 1, for example, the low transmission power base-station whitespace device (106), the medium transmission power base-station whitespace device (108), the high transmission power base-station whitespace device (110), the first user whitespace device (130), the second user whitespace device (132), the third user whitespace device (134), and the base-station array controller (102) are implemented to some extent at least as computers. For further explanation, therefore, FIG. 2 sets forth a block diagram of automated computing machinery comprising an exemplary base-station array controller (252) useful in controlling communication between whitespace devices according to embodiments of the present invention. The base-station array controller (252) of FIG. 2 includes at least one computer processor (256) or 'CPU' as well as random access memory (268) ('RAM') which is connected through a high speed memory bus (266) and bus adapter (258) to processor (256) and to other components of the base-station array controller (252).

Figure 2:
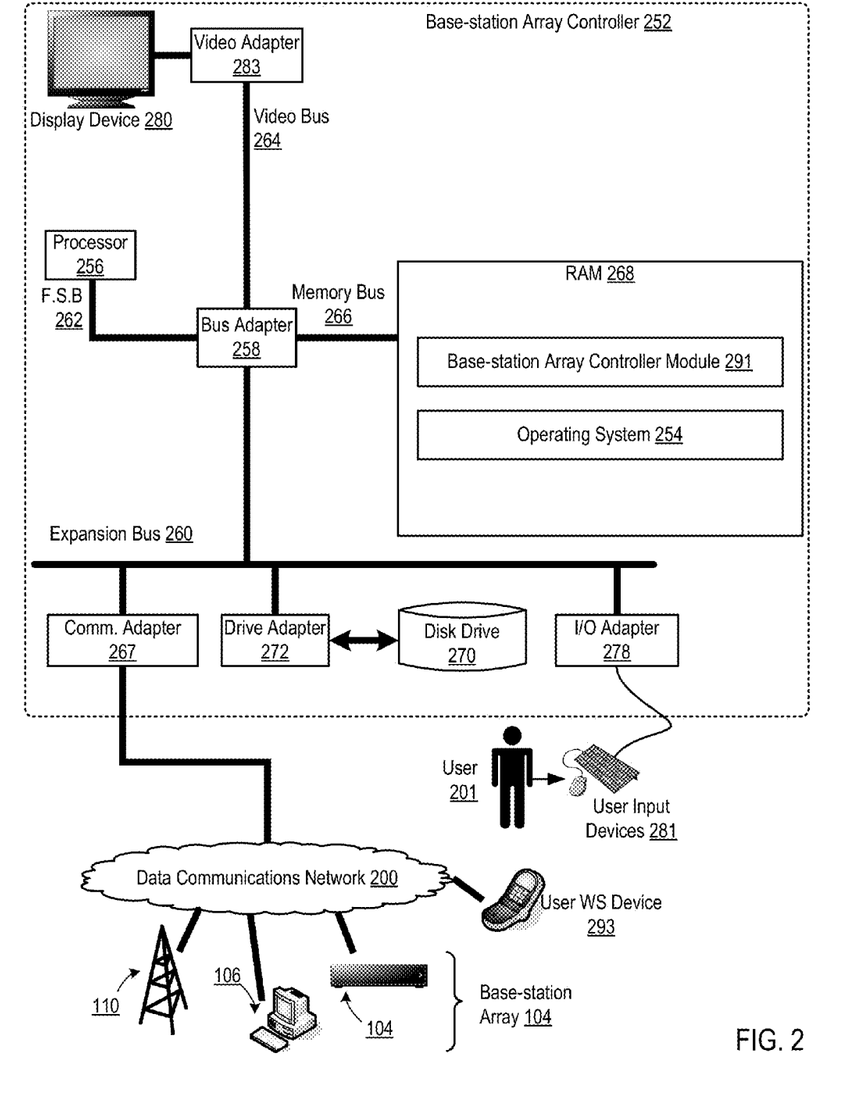
FIG. 2 sets forth a block diagram of automated computing machinery comprising an exemplary base-station array controller useful in controlling communication between whitespace devices according to embodiments of the present invention.

Stored in RAM (268) is a base-station array controller module (291) that includes computer program instructions for controlling communication between whitespace devices. In the example of FIG. 2, the base-station array controller module (291) includes computer program instructions that when executed by the computer processor (256) cause the base-station array controller (252) to carry out the steps of: identifying, by the base-station array controller (252), a user whitespace device (293) within a coverage area of a base-station array (104); identifying for each base-station whitespace device (110, 106, 104), by the base-station array controller (252), transmission channels available to the base-station whitespace device; selecting from the plurality of base-station whitespace devices (110, 106, 104), by the base-station array controller (252), a base-station whitespace device based on the power consumption profiles and the identified available transmission channels corresponding to the plurality of base-station whitespace devices (110, 106, 104); and instructing, by the base-station array controller (252), the selected base-station whitespace device to communicate with the identified user whitespace device (293) on one of the identified available transmission channels.

Also stored in RAM (268) is an operating system (254). Operating systems useful controlling communication between whitespace devices according to embodiments of the present invention include UNIX™, Linux™, Microsoft XP™, AIX™, IBM's i5/OS™, and others as will occur to those of skill in the art. The operating system (254) and the base-station array controller module (291) in the example of FIG. 2 are shown in RAM (268), but many components of such software typically are stored in non-volatile memory also, such as, for example, on a disk drive (270).

The base-station array controller (252) of FIG. 2 includes disk drive adapter (272) coupled through expansion bus (260) and bus adapter (258) to processor (256) and other components of the base-station array controller (252). Disk drive adapter (272) connects non-volatile data storage to the base-station array controller (252) in the form of disk drive (270). Disk drive adapters useful in computers for controlling communication between whitespace devices according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example base-station array controller (252) of FIG. 2 includes one or more input/output ('I/O') adapters (278). I/O adapters implement user-oriented input/output through, for example, software drivers and computer hardware for controlling output to display devices such as computer display screens, as well as user input from user input devices (281) such as keyboards and mice. The example base-station array controller (252) of FIG. 2 includes a video adapter (283), which is an example of an I/O adapter specially designed for graphic output to a display device (280) such as a display screen or computer monitor. Video adapter (283) is connected to processor (256) through a high speed video bus (264), bus adapter (258), and the front side bus (262), which is also a high speed bus.

The exemplary base-station array controller (252) of FIG. 2 includes a communications adapter (267) for data communications with other computers (282) and for data communications with a data communications network (200). Such data communications may be carried out serially through RS-232 connections, through external buses such as a Universal Serial Bus ('USB'), through data communications networks such as IP data communications networks, and in other ways as will occur to those of skill in the art. In addition, the communications adapter (267) may be a whitespace transmitter/receiver that is capable of communicating with the base-station whitespace devices and the user whitespace devices with a variety of communication protocols including over a whitespace frequency. Communications adapters implement the hardware level of data communications through which one computer sends data communications to another computer, directly or through a data communications network. Examples of communications adapters useful for controlling communication between whitespace devices according to embodiments of the present invention include modems for wired dial-up communications, Ethernet (IEEE 802.3) adapters for wired data communications network communications, and 802.11 adapters for wireless data communications network communications.

Figure 3:
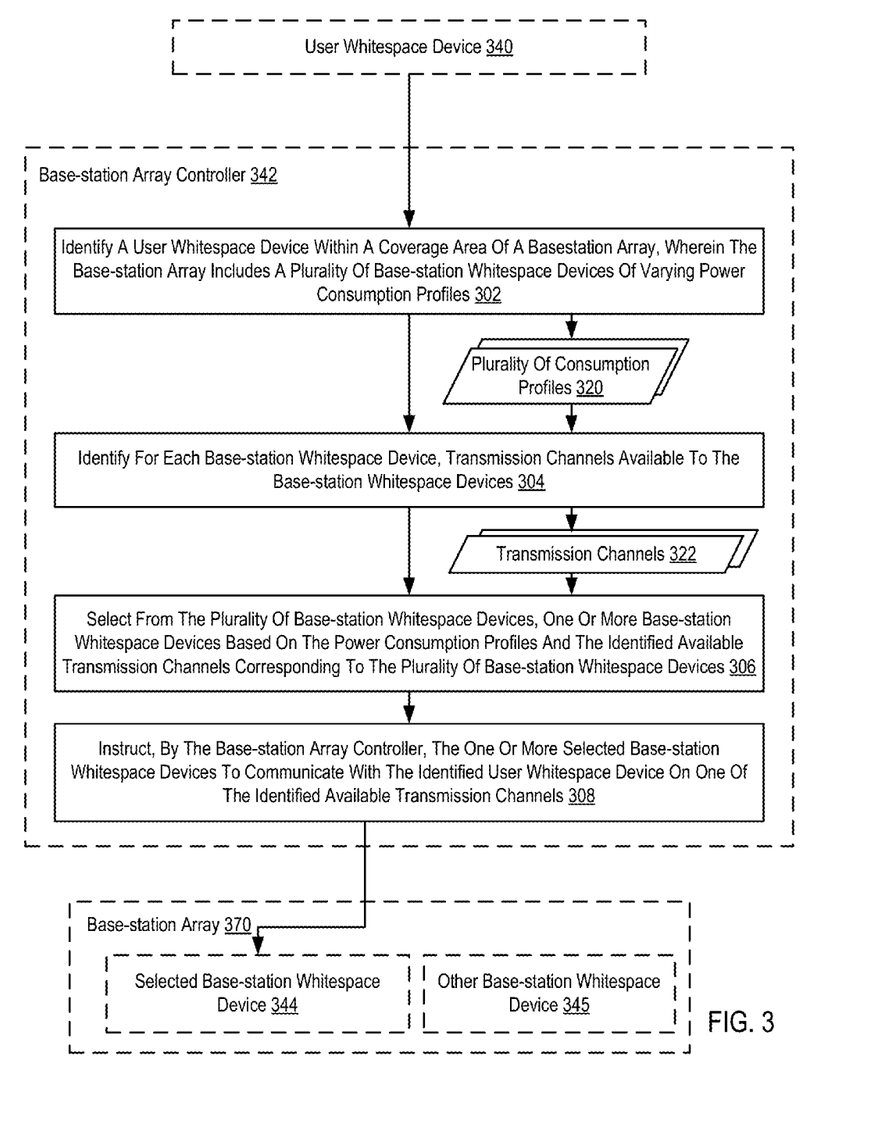
FIG. 3 sets forth a flow chart illustrating an exemplary method for controlling communication between whitespace devices according to embodiments of the present invention.

For further explanation, FIG. 3 sets forth a flow chart illustrating an exemplary method for controlling communication between whitespace devices according to embodiments of the present invention. The method of FIG. 3 includes identifying (302), by a base-station array controller (342), a user whitespace device (340) within a coverage area of a base-station array (370). In the example of FIG. 3, the base-station array (370) includes a plurality of base-station whitespace devices (344, 345) of varying power consumption profiles (320). Identifying (302), by a base-station array controller (342), a user whitespace device (340) within a coverage area of a base-station array (370) may be carried out by receiving a geo-location of the user whitespace device; comparing the geo-location to the coverage area of the array (370); and receiving an indication from one of the base-station whitespace devices indicating the user whitespace devices is within a coverage area of the base-station array (370).

The method of FIG. 3 also includes identifying (304) for each base-station whitespace device (344, 345), by the base-station array controller (342), transmission channels (322) available to the base-station whitespace device. Identifying (304) for each base-station whitespace device (344, 345), by the base-station array controller (342), transmission channels (322) available to the base-station whitespace device may be carried out by scanning transmission channels for transmission by other devices; and spectrum sensing.

The method of FIG. 3 includes selecting (306) from the plurality of base-station whitespace devices (344, 345), by the base-station array controller (342), a base-station whitespace device (344) based on the power consumption profiles (320) and the identified available transmission channels (322) corresponding to the plurality of base-station whitespace devices (344, 345). A power consumption profile indicates the transmission power capabilities of a base-station whitespace device. Selecting (306) from the plurality of base-station whitespace devices (344, 345), by the base-station array controller (342), a base-station whitespace device (344) based on the power consumption profiles (320) and the identified available transmission channels (322) corresponding to the plurality of base-station whitespace devices (344, 345) may be carried out by detecting the requirements of the user whitespace device including throughput requirements; and detecting distance of user whitespace devices from each of the base-station whitespace devices; and matching the user whitespace devices to the available channels of the base-stations to maximize benefits of the base-stations.

The method of FIG. 3 includes instructing (308), by the base-station array controller (342), the selected base-station whitespace device (344) to communicate with the identified user whitespace device (340) on one of the identified available transmission channels (322). Instructing (308), by the base-station array controller (342), the selected base-station whitespace device (344) to communicate with the identified user whitespace device (340) on one of the identified available transmission channels (322) may be carried out by transmitting an instruction message to the selected base-station whitespace device.

Figure 4:
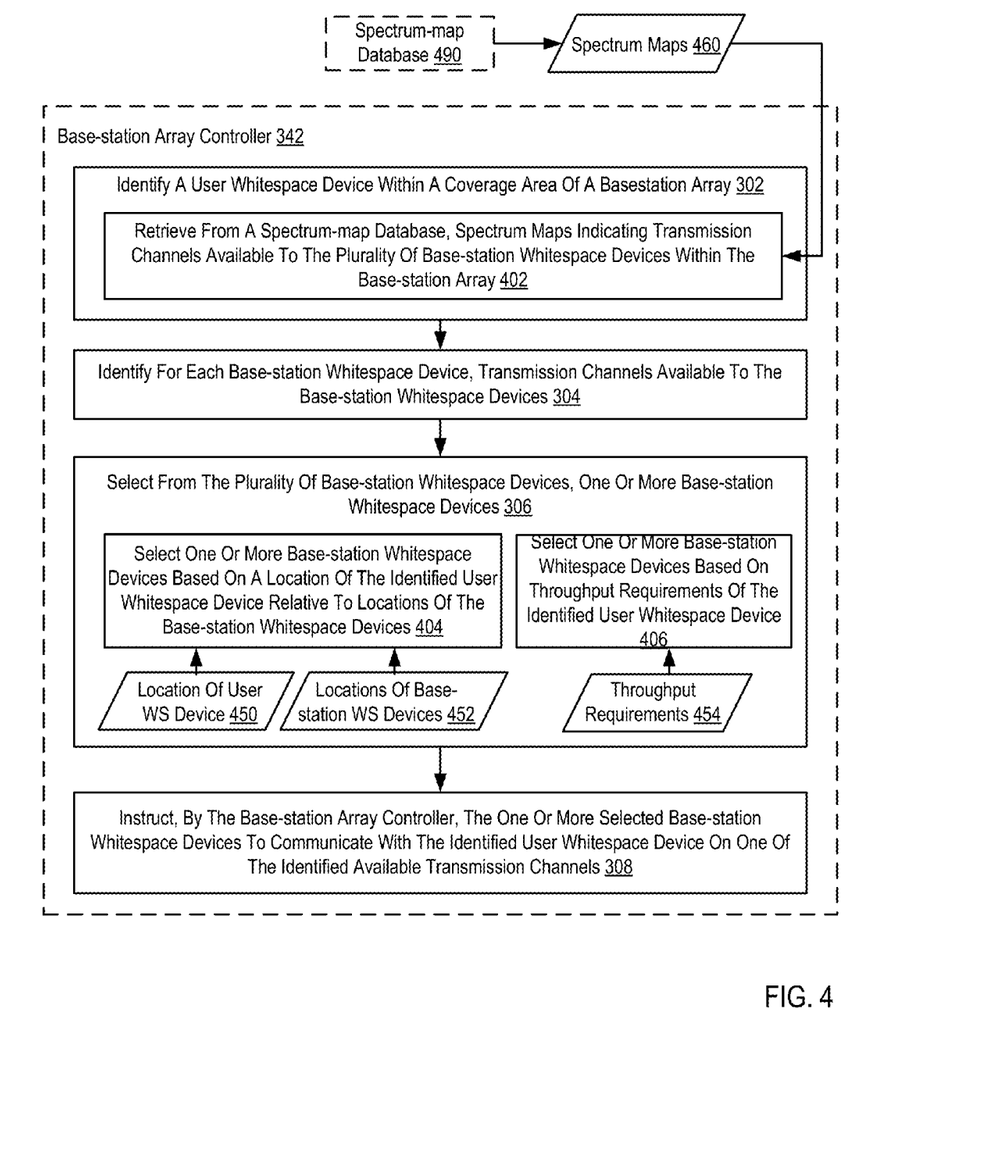
FIG. 4 sets forth a flow chart illustrating a further exemplary method for controlling communication between whitespace devices according to embodiments of the present invention.

For further explanation, FIG. 4 sets forth a flow chart illustrating a further exemplary method for controlling communication between whitespace devices according to embodiments of the present invention. The method of FIG. 4 is similar to the method of FIG. 3 in that the method of FIG. 4 also includes: identifying (302) a user whitespace device (340) within a coverage area of a base-station array (370); identifying (304) for each base-station whitespace device (344, 345) transmission channels (322) available to the base-station whitespace device; selecting (306) from the plurality of base-station whitespace devices (344, 345) a base-station whitespace device (344) based on the power consumption profiles (320) and the identified available transmission channels (322) corresponding to the plurality of base-station whitespace devices (344, 345); and instructing (308) the selected base-station whitespace device (344) to communicate with the identified user whitespace device (340) on one of the identified available transmission channels (322).

In the method of FIG. 4, however, identifying (302) a user whitespace device (340) within a coverage area of a base-station array (370) includes retrieving (402) from a spectrum-map database (490), by the base-station array controller (342), spectrum maps (460) indicating transmission channels available to the plurality of base-station whitespace devices (344, 345) within the base-station array (370). A spectrum-map database may be a storage location maintained by the Federal Communications Commission (FCC). The spectrum maps may indicate current and future utilization and reservations of the spectrum. Retrieving (402) from a spectrum-map database (490), by the base-station array controller (342), spectrum maps (460) indicating transmission channels available to the plurality of base-station whitespace devices (344, 345) within the base-station array (370) may be carried out by transmitting a geo-location and power consumption profile to an FCC database; and receiving a spectrum map corresponding to the geo-location and power consumption profile.

In the method of FIG. 4, selecting (306) from the plurality of base-station whitespace devices (344, 345) a base-station whitespace device (344) includes selecting (404) from the plurality of base-station whitespace devices (344, 345) a base-station whitespace device (344) based on a location (450) of the identified user whitespace device (340) relative to locations (452) of the base-station whitespace devices (344, 345). Selecting (404) from the plurality of base-station whitespace devices (344, 345) a base-station whitespace device (344) based on a location (450) of the identified user whitespace device (340) relative to locations (452) of the base-station whitespace devices (344, 345) may be carried out by selecting the lowest transmission power base-station that has a coverage area that includes a user whitespace device; and reserving channels of a higher transmission power base-station for user whitespace devices outside coverage areas of lower transmission power base-station whitespace devices.

In the method of FIG. 4, selecting (306) from the plurality of base-station whitespace devices (344, 345) a base-station whitespace device (344) includes selecting (406) from the plurality of base-station whitespace devices (344, 345) a base-station whitespace device (344) based on throughput requirements (454) of the identified user whitespace device (340). Selecting (406) from the plurality of base-station whitespace devices (344, 345) a base-station whitespace device (344) based on throughput requirements (454) of the identified user whitespace device (340) may be carried out by selecting higher transmission power base-station whitespace devices for user whitespace devices requiring higher throughput and reserving lower transmission power base-station whitespace devices for user whitespace devices requiring lower throughput.

Figure 5:
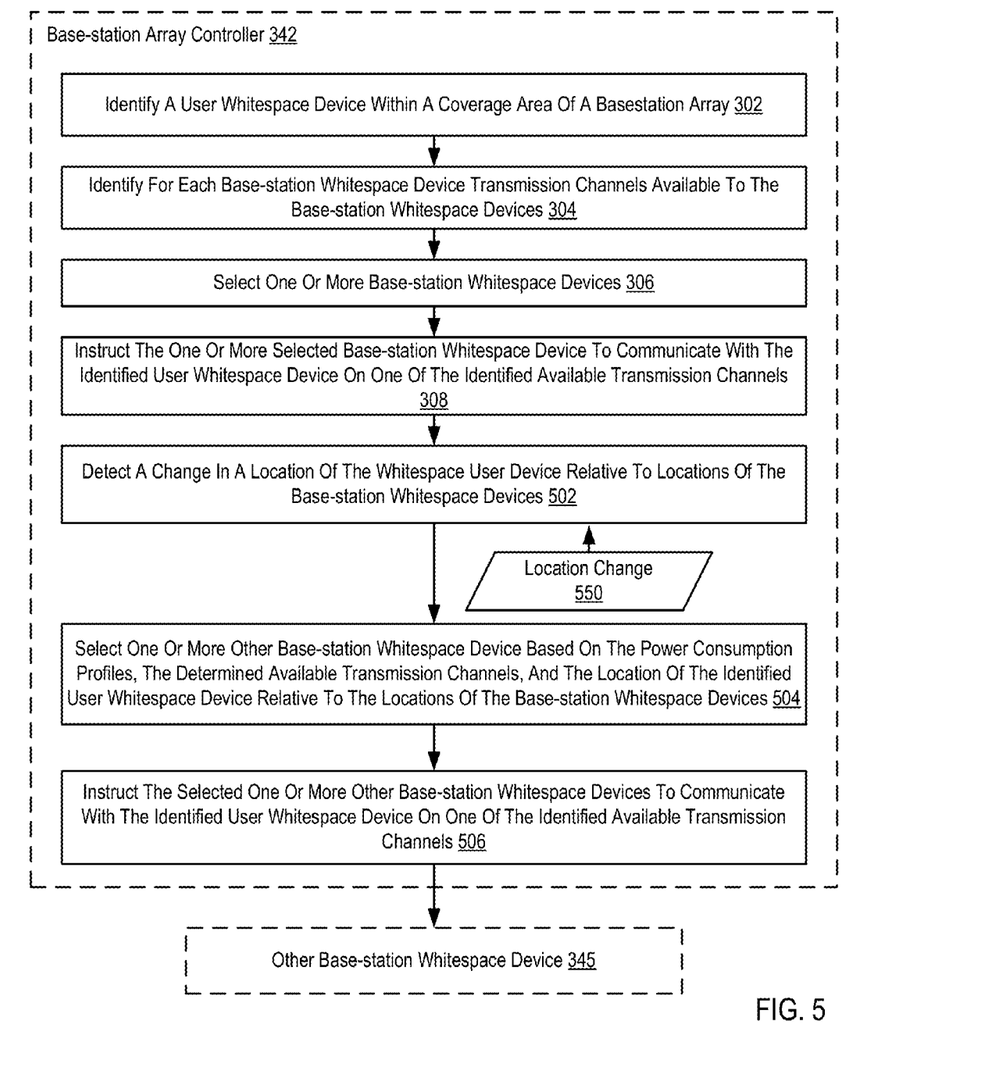
FIG. 5 sets forth a flow chart illustrating a further exemplary method for controlling communication between whitespace devices according to embodiments of the present invention.

For further explanation, FIG. 5 sets forth a flow chart illustrating a further exemplary method for controlling communication between whitespace devices according to embodiments of the present invention. The method of FIG. 5 is similar to the method of FIG. 3 in that the method of FIG. 5 also includes: identifying (302) a user whitespace device (340) within a coverage area of a base-station array (370); identifying (304) for each base-station whitespace device (344, 345) transmission channels (322) available to the base-station whitespace device; selecting (306) from the plurality of base-station whitespace devices (344, 345) a base-station whitespace device (344) based on the power consumption profiles (320) and the identified available transmission channels (322) corresponding to the plurality of base-station whitespace devices (344, 345); and instructing (308) the selected base-station whitespace device (344) to communicate with the identified user whitespace device (340) on one of the identified available transmission channels (322).

The method of FIG. 5 also includes detecting (502), by the base-station array controller (342), a change (550) in a location (450) of the whitespace user device (340) relative to locations (452) of the base-station whitespace devices (344, 345). Detecting (502), by the base-station array controller (342), a change (550) in a location (450) of the whitespace user device (340) relative to locations (452) of the base-station whitespace devices (344, 345) may be carried out by receiving data indicating geo-location of user whitespace device; and comparing the received data to previously receiving geo-location data to determine the change in location of the user whitespace device.

The method of FIG. 5 includes selecting (504) from the plurality of base-station whitespace devices (344, 345), by the base-station array controller (342), another base-station whitespace device (345) based on the power consumption profiles (320), the determined available transmission channels (322), and the location (450) of the identified user whitespace device (342) relative to the locations (452) of the base-station whitespace devices (344, 345). Selecting (504) from the plurality of base-station whitespace devices (344, 345), by the base-station array controller (342), another base-station whitespace device (345) based on the power consumption profiles (320), the determined available transmission channels (322), and the location (450) of the identified user whitespace device (342) relative to the locations (452) of the base-station whitespace devices (344, 345) may be carried out by selecting the lowest transmission power base-station that has a coverage area that includes a user whitespace device; and reserving channels of a higher transmission power base-station for user whitespace devices outside coverage areas of lower transmission power base-station whitespace devices.

The method of FIG. 5 includes instructing (506), by the base-station array controller (342), the selected other base-station whitespace device (345) to communicate with the identified user whitespace device (342) on one of the identified available transmission channels (322). Instructing (506), by the base-station array controller (342), the selected other base-station whitespace device (345) to communicate with the identified user whitespace device (342) on one of the identified available transmission channels (322) may be carried out by transmitting an instruction message to the selected base-station whitespace device.

Exemplary embodiments of the present invention are described largely in the context of a fully functional computer system for controlling communication between whitespace devices. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of controlling communication between whitespace devices, the method comprising:
   identifying, by a base-station array controller, a user whitespace device within a coverage area of a base-station array, wherein the base-station array includes a plurality of base-station whitespace devices of varying power consumption profiles;
   identifying for each base-station whitespace device, by the base-station array controller, transmission channels available to the base-station whitespace device;
   selecting from the plurality of base-station whitespace devices, by the base-station array controller, a base-station whitespace device to communicate with the identified user whitespace device, based on the power consumption profiles, the identified available transmission channels corresponding to the plurality of base-station whitespace devices, a location of the identified user whitespace device relative to locations of the base-station whitespace devices, and a location of another user whitespace device relative to the locations of the base-station whitespace devices; and
   instructing, by the base-station array controller, the selected base-station whitespace device to communicate with the identified user whitespace device on one of the identified available transmission channels.

2. The method of claim 1 wherein selecting from the plurality of base-station whitespace devices, by the base-station array controller, a base-station whitespace device is further based on throughput requirements of the identified user whitespace device.

3. The method of claim 1 further comprising:
   detecting, by the base-station array controller, a change in a location of the whitespace user device relative to locations of the base-station whitespace devices;
   selecting from the plurality of base-station whitespace devices, by the base-station array controller, another base-station whitespace device based on the power consumption profiles, the determined available transmission channels, and the location of the identified user whitespace device relative to the locations of the base-station whitespace devices; and
   instructing, by the base-station array controller, the selected other base-station whitespace device to communicate with the identified user whitespace device on one of the identified available transmission channels.

4. The method of claim 1 wherein identifying for each base-station whitespace device, by the base-station array controller, transmission channels available to the base-station whitespace device includes retrieving from a spectrum-map database, by the base-station array controller, spectrum maps indicating transmission channels available to the plurality of base-station whitespace devices within the base-station array.

5. The method of claim 1 wherein the base-station array includes a first base-station whitespace device with a fixed location within the coverage area of the base-station array and a second base-station whitespace device that is mobile whitespace device.

* * * * *